(12) United States Patent
Hamdan (10) Patent No.: US 8,886,511 B2
(45) Date of Patent: Nov. 11, 2014

(54) MODELING OUTPUT DELAY OF A CLOCKED STORAGE ELEMENT(S)

(75) Inventor: Fadi A. Hamdan, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 724 days.

(21) Appl. No.: 12/882,725

(22) Filed: Sep. 15, 2010

(65) Prior Publication Data

US 2012/0065955 A1 Mar. 15, 2012

(51) Int. Cl.
*G06F 17/50* (2006.01)

(52) U.S. Cl.
CPC ........ *G06F 17/5031* (2013.01); *G06F 17/5022* (2013.01); *G06F 17/5009* (2013.01); *G06F 2217/84* (2013.01)
USPC .......................................................... 703/19

(58) Field of Classification Search
None
See application file for complete search history.

(56) References Cited

U.S. PATENT DOCUMENTS

| | | | | |
|---|---|---|---|---|
| 5,655,109 | A * | 8/1997 | Hamid | 716/103 |
| 6,378,113 | B1 * | 4/2002 | Levitsky et al. | 716/113 |
| 6,701,498 | B2 | 3/2004 | Becker et al. | |
| 6,877,143 | B1 * | 4/2005 | Palermo et al. | 716/108 |
| 6,996,515 | B1 * | 2/2006 | Foltin et al. | 703/19 |
| 8,159,888 | B2 * | 4/2012 | Raghunathan et al. | 365/193 |
| 2003/0192020 | A1 * | 10/2003 | Collins, Jr. | 716/6 |
| 2003/0212972 | A1 * | 11/2003 | Tran | 716/6 |
| 2007/0226668 | A1 | 9/2007 | Dasdan et al. | |
| 2008/0141201 | A1 * | 6/2008 | Do et al. | 716/6 |
| 2009/0144682 | A1 * | 6/2009 | Brown et al. | 716/6 |
| 2009/0288051 | A1 | 11/2009 | Hemmett et al. | |

OTHER PUBLICATIONS

Taskin Advanced Timing and synchronization Methodologies for digital VLSI Integrated Circuits University of Pittsburgh, 2005.*
Salman et al. Exploiting Setup-Hold-Time Interdependence in Static Timing Analysis IEEE Transactions on Computer-Aided Design of Integrated Circuits and Systems, vol. 26, No. 6 Jun. 2007, pp. 1114-1125.*
Shweta Srivastava, Jaijeet Roychowdhury Rapid and Accurate Latch Charaterization via Direct Newton Solution of Setup/Hold Times 978-3-9810801-2/DATE07, 2007 EDAA.*
Abrishami, et al., "Multi-corner, energy-delay optimized, NBTI-aware flip-flop design", Quality Electronic Design (ISQED), 2010 11th International Symposium on, IEEE, Piscataway, NJ, USA, Mar. 22, 2010, pp. 652-659, XP031660273, ISBN: 978-1-4244-6454-8.

(Continued)

*Primary Examiner* — Omar Fernandez Rivas
*Assistant Examiner* — Cuong Luu
(74) *Attorney, Agent, or Firm* — Nicholas J. Pauley; Peter Michael Kamarchik; Joseph Agusta (57) ABSTRACT

Methods, apparatuses, systems, and computer-readable mediums for modeling output delay of a clocked storage element(s) are disclosed. An output delay model is employed that includes variations in the output delays for the clocked storage element over an operating range of the clocked storage element, including during transitions from transparent operation to non-transparent operation, and vice versa. Errors in the model output delay are reduced or avoided as a result. In one embodiment, the model output delay is determined for the clocked storage element as a function of the differential timing between the arrival time of a clock signal and input data to the clocked storage element. The differential timing allows determination of a model output delay from a plurality of model output delays representing a model output delay curve for the clocked storage element. Time borrowing can also be modeled automatically without the need for a second output delay model.

17 Claims, 11 Drawing Sheets

(56) References Cited

OTHER PUBLICATIONS

Amin, et al., "Modeling unbuffered latches for timing analysis", Computer Aided Design, ICCAD-2004, IEEE/ACM International Conference on San Jose, CA, USA Nov. 7-11, 2004, Piscataway, NJ, USA,IEEE, Nov. 7, 2004, pp. 254-260, XP010763268, DOI: 10.1109/ICCAD.2004.1382582, ISBN: 978-0-7803-8702-7.

International Search Report and Written Opinion—PCT/US2011/051613—ISA/EPO—Dec. 20, 2011.

Nedovic N., et al., "A clock skew absorbing flip-flop", Solidstate Circuits Conference, 2003. Digest of Technical Papers. ISS CC. 2003 IEEE International San Francisco, CA, USA Feb. 9-13, 2003, Piscataway, NJ, USA, IEEE, US, Feb. 9, 2003, pp. 1-10, XP010661624, ISBN: 978-0-7803-7707-3.

Salman, et al., "Exploiting Setup-Hold-Time Interdependence in Static Timing Analysis", IEEE Transactions on Computer Aided Design of Integrated Circuits and Systems, IEEE Service Center, Piscataway, NJ, US, vol. 26, No. 6, Jun. 1, 2007, pp. 1114-1125, XP011184597, ISSN: 0278-0070, DOI: 10.1109/TCAD.2006.885834.

Srivastava, et al., "Independent and Interdependent Latch Setup/Hold Time Characterization via Newtona Raphson Solution and Euler Curve Tracking of State-Transition Equations", IEEE Transactions on Computer Aided Design of Integrated Circuits and Systems, IEEE Service Center, Piscataway, NJ, US, vol. 27, No. 5, May 1, 2008, pp. 817-830, XP011207803, ISSN: 0278-0070.

Stojanovic V., et al., "Comparative analysis of latches and flip-flops for high-performance systems", Computer Design: VLSI in Computers and Processors, 1998. ICCD '98. Proceedings. International Conference on Austin, TX, USA Oct. 5-7, 1998, Los Alamitos, CA, USA, IEEE Comput. Soc, US, Oct. 5, 1998, pp. 264-269, XP010310331, DOI: 10.1109/ICCD.1998.727060 ISBN: 978-0-8 186-9099-0.

Stojanovic V., et al., "Comparative Analysis of Master-Slave Latches and Flip-Flops for High-Performance and Low-Power Systems", IEEE Journal of Solid-State Circuits, IEEE Service Center, Piscataway, NJ, USA, vol. 34, No. 4, Apr. 1, 1999, pp. 536-548, XP011060988, ISSN: 0018-9200.

\* cited by examiner

| | $SR_0$ | $SR_1$ | SLEW RATE (SR) $SR_2$ | ... | $SR_M$ |
|---|---|---|---|---|---|
| $L_0$ | clk-to-q [0,0]<br>a-to-q [0,0] | clk-to-q [1,0]<br>a-to-q [1,0] | clk-to-q [2,0]<br>a-to-q [2,0] | ... | clk-to-q [M,0]<br>a-to-q [M,0] |
| $L_1$ | clk-to-q [0,1]<br>a-to-q [0,1] | clk-to-q [1,1]<br>a-to-q [1,1] | clk-to-q [2,1]<br>a-to-q [2,1] | ... | clk-to-q [M,1]<br>a-to-q [M,1] |
| $L_2$ | clk-to-q [0,2]<br>a-to-q [0,2] | clk-to-q [1,2]<br>a-to-q [1,2] | clk-to-q [2,2]<br>a-to-q [2,2] | ... | clk-to-q [M,2]<br>a-to-q [M,2] |
| ... | ... | ... | ... | ... | ... |
| $L_N$ | clk-to-q [0,N]<br>a-to-q [0,N] | clk-to-q [1,N]<br>a-to-q [1,N] | clk-to-q [2,N]<br>a-to-q [2,N] | ... | clk-to-q [M,N]<br>a-to-q [M,N] |

LOAD (L)

| | SR₀ | SR₁ | SR₂ | ... | SR_M |
|---|---|---|---|---|---|
| L₀ | clk-to-q [C₀,0]<br>a-to-q [C₀,0] | clk-to-q [C₁,0]<br>a-to-q [C₁,0] | clk-to-q [C₂,0]<br>a-to-q [C₂,0] | ... | clk-to-q [C_M,0]<br>a-to-q [C_M,0] |
| L₁ | clk-to-q [C₀,1]<br>a-to-q [C₀,1] | clk-to-q [C₁,1]<br>a-to-q [C₁,1] | clk-to-q [C₂,1]<br>a-to-q [C₂,1] | ... | clk-to-q [C_M,1]<br>a-to-q [C_M,1] |
| L₂ | clk-to-q [C₀,2]<br>a-to-q [C₀,2] | clk-to-q [C₁,2]<br>a-to-q [C₁,2] | clk-to-q [C₂,2]<br>a-to-q [C₂,2] | ... | clk-to-q [C_M,2]<br>a-to-q [C_M,2] |
| ... | ... | ... | ... | ... | ... |
| L_N | clk-to-q [C₀,N]<br>a-to-q [C₀,N] | clk-to-q [C₁,N]<br>a-to-q [C₁,N] | clk-to-q [C₂,N]<br>a-to-q [C₂,N] | ... | clk-to-q [C_M,N]<br>a-to-q [C_M,N] |

MODELING OUTPUT DELAY OF A CLOCKED STORAGE ELEMENT(S)

BACKGROUND

I. Field of the Disclosure

The technology of the disclosure relates to modeling output delay of a clocked storage element. For example, the output delay can be used to model delay of clocked storage elements in a circuit timing model.

II. Background

Timing analysis of circuits employing clocked storage elements can be used to determine the expected timings of circuit paths. The expected timings assist in identifying problem areas during the design phase and in advance of fabrication of the circuit. In this regard, modeling tools can be employed to simulate delay in logic transitions in clocked storage elements in a synthesized circuit design. To simulate delay, delay models are provided for the clocked storage elements in the modeling tool. The delay models simulate the delay between arrival of input data signals to clocked storage elements and output data signals generated in response. The model delay can be used to determine whether the circuit meets desired timing constraints, and thus if the circuit is likely to operate properly if fabricated according to the tested design. For example, the delay may be used to determine if timings associated with one or more critical paths in a circuit are acceptable. If the circuit does not meet desired timing constraints, the circuit design can be altered and then reanalyzed using the modeling tool until desired timing constraints are met, prior to fabrication.

One example of a clocked storage element commonly employed in circuits is a latch. The latch may be designed to operate both transparently and non-transparently of the clock signal. If the input data arrives at the latch before the rising edge of a clock the latch will operate non-transparently of the clock signal. In non-transparent mode, the output delay of the latch is controlled by the clock signal since the rising edge of the clock signal arrives later than the input data. The latch may also be designed to operate transparently of the clock signal. In transparent mode, the output delay of the latch is controlled by the input data since the input data arrives later than the rising edge of the dock signal. This is also known as "time borrowing" or "cycle stealing."

Two constant output delay values can be used by a modeling tool to simulate delay in a latch configured to operate in both non-transparent and transparent modes. However, if the input data arrives after the setup time of the latch when the latch is between non-transparent and transparent modes, a constant output delay value may not accurately reflect the output delay of the latch.

SUMMARY OF THE DISCLOSURE

Embodiments disclosed in the detailed description include methods, apparatuses, systems, and computer-readable mediums for modeling output delay of clocked storage element(s). Rather than modeling output delay of a clocked storage element as a constant delay, embodiments in the detailed description employ output delay models for clocked storage elements that represent the variations in the output delays over an operating range of the clocked storage element. Errors in the model output delay are reduced or avoided as a result when the variation in output delay would have deviated from a constant output delay. For example, errors can result when modeling output delay for a clocked storage element as a constant value, since output delay of a clocked storage element is not constant over the operating range of the clocked storage element. Further, output delay of a clocked storage element may vary from nominal output delays near and during setup times for the clocked storage element, including during transitions from transparent operation to non-transparent operation, and vice versa.

In this regard, in one embodiment, a method of modeling output delay of at least one clocked storage element is provided. The method comprises determining a first arrival time of a clock signal input into at least one clocked storage element. The method also comprises determining a second arrival time of an input data signal input into the at least one clocked storage element. The method further comprises determining a differential timing between the first arrival time and the second arrival time. A model output delay of the at least one clocked storage element is determined as a function of the differential timing.

In another embodiment, a circuit modeling apparatus is provided. The circuit modeling apparatus includes a control system. The control system is configured to determine a first arrival time of a clock signal input into at least one clocked storage element. The control system is also configured to determine a second arrival time of an input data signal input into the at least one clocked storage element. The control system is also configured to determine a differential timing between the first arrival time and the second arrival time. The control system is then configured to determine a model output delay of the at least one clocked storage element as a function of the differential timing.

In another embodiment, a computer-readable medium for modeling output delay of at least one clocked storage element is provided. The computer-readable medium comprises instructions for determining a first arrival time of a clock signal input into at least one clocked storage element. The computer-readable medium also comprises instructions for determining a second arrival time of an input data signal input into the at least one clocked storage element. The computer-readable medium also comprises instructions for determining a differential timing between the first arrival time and the second arrival time. The computer-readable medium also comprises instructions for determining a model output delay of the at least one clocked storage element as a function of the differential timing.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, apparatuses, systems, and computer-readable mediums for modeling output delay of a clocked storage element(s). Rather than modeling output delay of a clocked storage element as a constant delay, embodiments in the detailed description employ output delay models for clocked storage elements that represent the variations in the output delays over an operating range of the clocked storage element. Errors in the model output delay are reduced or avoided as a result when the variation in output delay would have deviated from a constant output delay. For example, errors can result when modeling output delay for a clocked storage element as a constant value, since output delay of a clocked storage element is not constant over the operating range of the clocked storage element. Further, output delay of a clocked storage element may vary from nominal output delays near and during setup times for the clocked storage element, including during transitions from transparent operation to non transparent operation, and vice versa.

Prior to discussing examples of output delay models for clocked storage elements that allow modeling of output delay as a function of differential timing between the arrival of a clock signal and an input data signal, FIGS. 1A-3 are first provided and described below to discuss how output delay error can result from employing an output delay model that uses a constant output delay to model output delay of the clocked storage element.

Figure 1A:
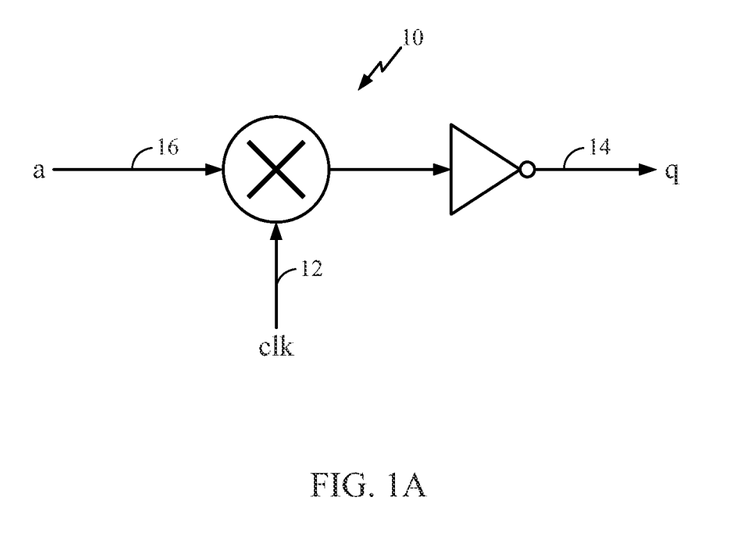
FIG. 1A is a block diagram of a portion of an exemplary latch clocked storage element.

In this regard, FIG. 1A illustrates a block diagram of a portion of an exemplary clocked storage element in the form of a latch 10. The latch 10 is clocked by a clock signal 12 from a clock (clk). The latch 10 has an associated output delay to generate output data (q) on an output data signal 14 in response to receipt of input data (a) on an input data signal 16. The latch 10 is configured to generate the output data (q) non-transparently of the clock signal 12, where the clock signal 12 arrives after the arrival of the input data (a) and controls the launch of the output data (q). The latch 10 is also configured to launch the output data (q) transparently of the clock signal 12, where the input data (a) arrives after the arrival of the clock signal 12.

Figure 1B:
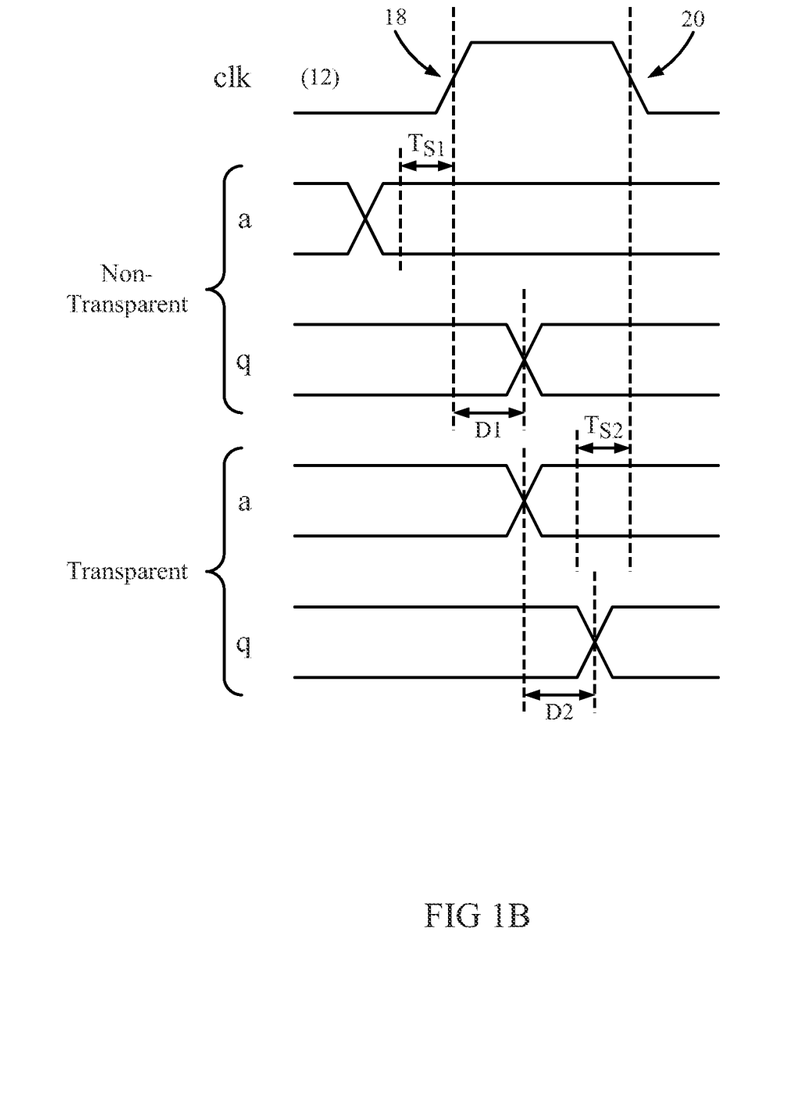
FIG. 1B is an example timing diagram illustrating operation of the latch in FIG. 1A in non-transparent and transparent modes.

As illustrated in FIG. 1B, if the input data (a) arrives such that the setup time ($T_{S1}$) is met prior to arrival of a rising edge 18 of the clock signal 12, the latch 10 operates non-transparently of the clock signal 12. In this scenario, the rising edge 18 of the clock signal 12 controls the launch of the output data (q) by the latch 10, as illustrated in the non-transparent operation in FIG. 11 3. The output delay ($D_1$) of the latch 10 in non-transparent operation will be the time between arrival of the rising edge 18 of the clock signal 12 and the launch of the output data (q), also known as "clk-to-q" delay. If however, the input data (a) arrives such that the setup time ($T_{S1}$) cannot be met prior to arrival of the rising edge 18 of the clock signal 12, but the input data (a) arrives prior to the setup time ($T_{S2}$) prior to a falling edge 20 of the clock signal 12 where the latch 10 is turned off, the latch 10 operates transparently of the clock signal 12. In this scenario, the arrival of the input data (a) controls the launch of the output data (q) by the latch 10 into the next portion of the clock cycle, as illustrated in the transparent operation in FIG. 1B. This is known as "time borrowing" or "cycle stealing." The output delay ($D_2$) of the latch 10 in transparent operation will be the time between arrival of the input data (a) and the launch of the output data (q), also known as "a-to-q" delay.

Figure 2:
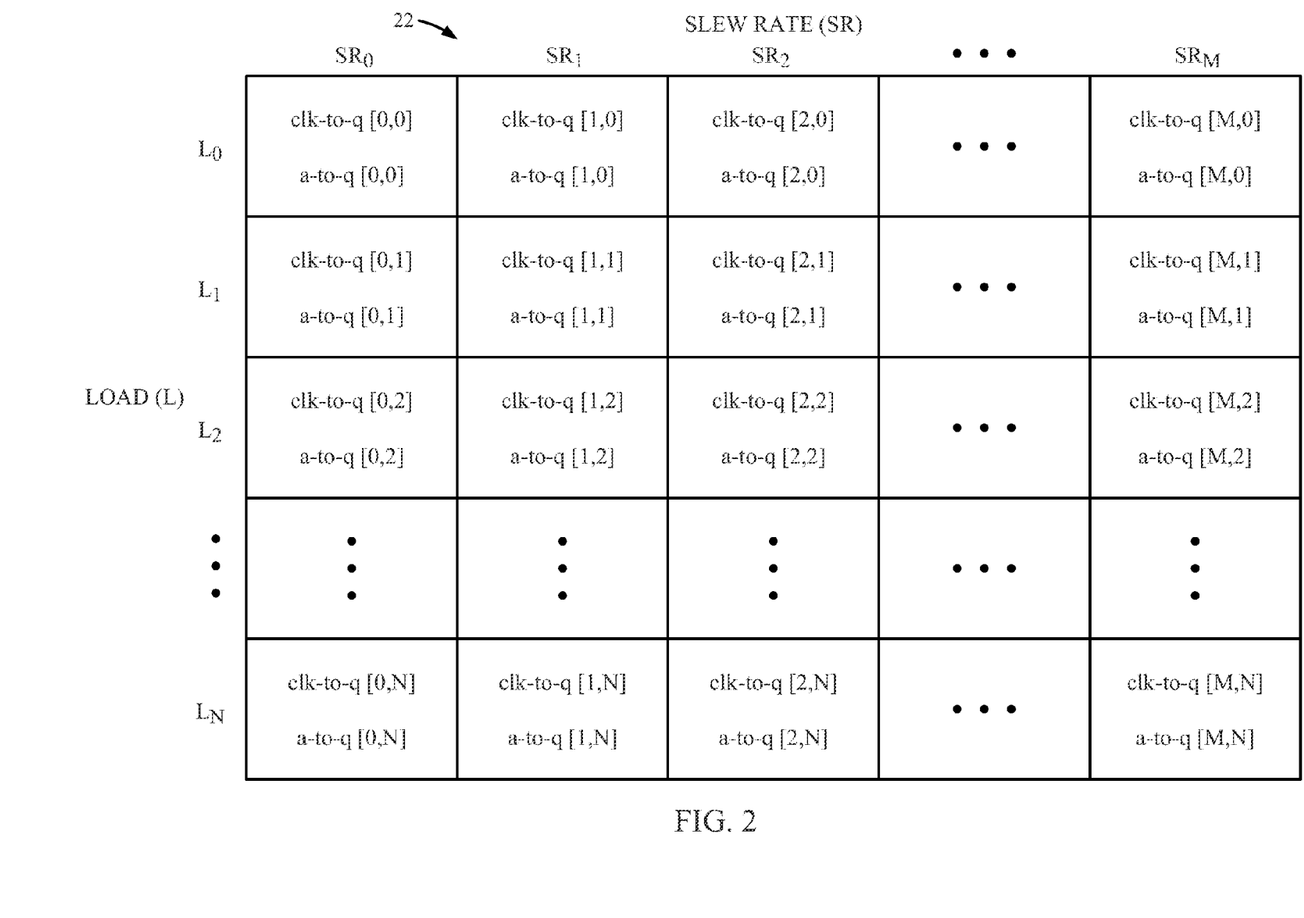
FIG. 2 is an exemplary model output delay table storing a constant model output delay for non-transparent and transparent operation of a latch based on load and slew rate.

When modeling output delay of a latch that can operate both non-transparently and transparently of a clock signal, such as the latch 10 in FIG. 1A, the output delay can be modeled as "clk-to-q" delay in non-transparent operation and "a-to-q" delay in transparent operation. In this regard, FIG. 2 is an exemplary model output delay table 22 storing a constant model output delay of the latch 10 as a function of load (L) and slew rate (SR) of the output data signal 14. As illustrated in FIG. 2, for each load ($L_{0-N}$) and each slew rate ($SR_{0-M}$) combination, two constant output delays are provided: a "clk-to-q" delay and an "a-to-q" delay. For example, if the load is $L_2$ and the slew rate is $SR_1$, the output delays for use when modeling output delay of the latch 10 are "clk-to-q" [1, 2] and "a-to-q" [1,2]. In this example, the output delay "clk-to-q" [1, 2] will be used to model output delay of the latch 10 in FIG. 1A if the input data (a) arrives prior to arrival of the rising edge 18 of the clock signal 12 such that the setup time ($T_{S1}$) of the latch 10 can be met. The output delay "a-to-q" [1, 2] will be used to model output delay of the latch 10 if the setup time ($T_{S1}$) of the latch 10 cannot be met prior to arrival of the rising edge 18 of the clock signal 12, but can be met prior to arrival of the falling edge 20 of the clock signal 12.

Using a constant output delay value to model output delay of a clocked storage element, such as the latch 10, can cause error in the model output delay. This is illustrated in an exemplary output delay graph 24 in FIG. 3. In this regard, the output delay graph 24 includes a "clk-to-q" output delay curve 26 and an "a-to-q" output delay curve 28 for the latch 10 in FIG. 1A at one specific load (L) and slew rate (SR) combination. The "clk-to-q" output delay curve 26 and the "a-to-q" output delay curve 28 show the output delay of the latch 10 as a function of the difference in time between the arriving of the input data (a) and the clock signal 12, shown as the X-axis "a-to-clk differential timing" in FIG. 3. A negative "a-to-clk differential timing" indicates that the input data (a) arrived at the latch 10 before the clock signal 12, and thus the output delay of the latch 10 will be governed by the "clk-to-q" delay of the latch 10. A positive "a-to-clk differential timing" indicates that the clock signal 12 arrived at the latch 10 before the input data (a), and thus the output delay of the latch 10 will be governed by the "a-to-q" delay of the latch 10. The Y-axis of the output delay graph 24 is the output delay of the latch 10 based on the "a-to-clk arrival time." The zero point (0) is where the input data (a) and the clock signal 12 arrive at the same time, and thus the "clk-to-q" output delay curve 26 and the "a-to-q" output delay curve 28 intersect indicating that the clk-to-q delay will be the same as the "a-to-q" delay in this scenario.

Looking at the "clk-to-q" output delay curve 26 when the input data (a) arrives prior to the clock signal 12, "clk-to-q" delay is substantially constant. Similarly, looking at the "a-to-q" output delay curve 28 when the input data (a) arrives after to the clock signal 12, "a-to-q" delay is also substantially constant. "Clk-to-q" delay constant 30 and "a-to-q" delay constant 32 in FIG. 2 are selected to represent output delays for the latch 10. These constant "clk-to-q" and "a-to-q" delays 30, 32 are delay values used in the model output delay table 22 in FIG. 2 to model output delay of the latch 10. However, as seen from the "clk-to-q" output delay curve 26 and the "a-to-q" output delay curve 28, the constant "clk-to-q" and "a-to-q" delays 30, 32 are not always indicative of the output delay of the latch 10. As a result, if the constant "clk-to-q" and "a-to-q" delays 30, 32 are exclusively used to model output delay of the latch 10, the model output delay of the latch 10 may be erroneous in certain instances, as discussed below.

Figure 3:
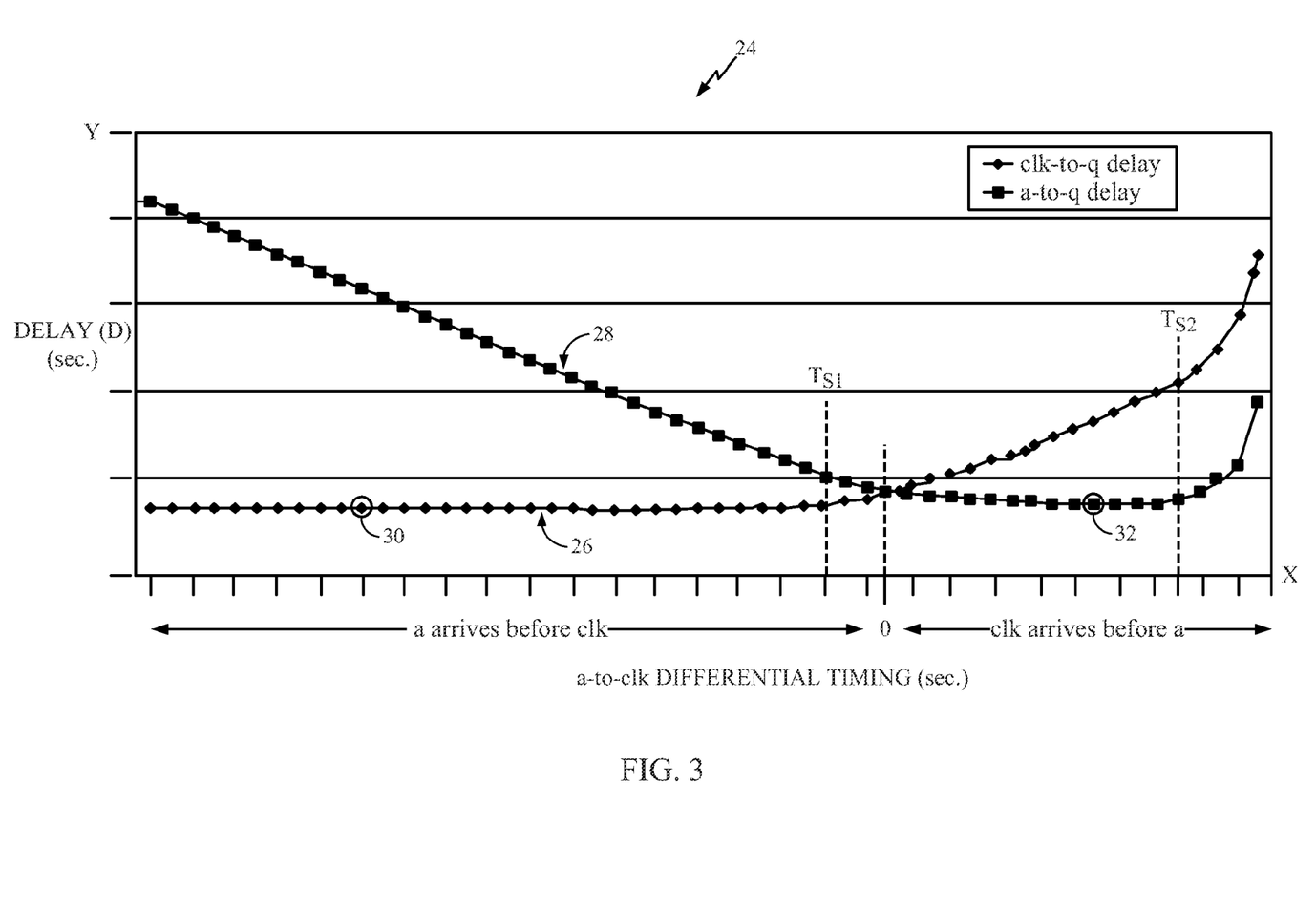
FIG. 3 is an exemplary output delay graph comprising output delay curves for non-transparent and transparent operation of a latch.

For example, as shown in the output delay graph 24 in FIG. 3, when the input data (a) starts to arrive at the latch 10 later and closer to within the setup time ($T_{S1}$) of the rising edge 18 of the clock signal 12, the "clk-to-q" delay, as shown by the "clk-to-q" output delay curve 26, starts to increase above the constant "clk-to-q" delay 30. As an example, the setup time ($T_{S1}$) to the rising edge 18 of the clock signal 12 may be defined as the ten percent (10%) degradation point of the latch 10. The point where the "clk-to-q" output delay curve 26 then becomes linear means the input data (a) arrived too late at the latch 10, and will control the launch of the output data (q) by the latch 10 rather than the clock signal 12. Thus, if the input data (a) arrives after the setup time ($T_{S1}$), where the clk-to-q delay starts to increase above the constant "clk-to-q" delay 30, the latch 10 is between full non-transparent and full transparent modes where both the input data (a) and the clock signal affect the launch of the output data (q) resulting in inaccurate output delay for the latch 10. With continuing reference to FIG. 3, the "a-to-q" output delay curve 28 shows the opposite behavior. When the latch 10 begins to transition into full transparent mode, the a-to-q" output delay curve 28, starts to decrease eventually becoming a constant delay when in full transparent mode. The constant delay is the constant "a-to-q" delay 32. When the input data (a) arrives at the latch 10 within the setup time ($T_{S2}$), the clock signal 12 shutting off the latch 10 will increase the delay until the "a-to-q" delay 32 degrades to a point of failure. As an example, the setup time ($T_{S2}$) to the falling edge 20 of the clock signal 12 may be defined as the five percent (5%) degradation point of the latch 10.

As circuit designs tend to decrease the delay between arrival of input data (a) and the clock to reduce path delays in the circuit, error can more often result when modeling output delay using constant "clk-to-q" delay 30 and constant "a-to-q" delay 32. This is because the clocked storage element is more likely to operate in the transition region from between full non-transparent operation and full transparent operation.

Figure 4:
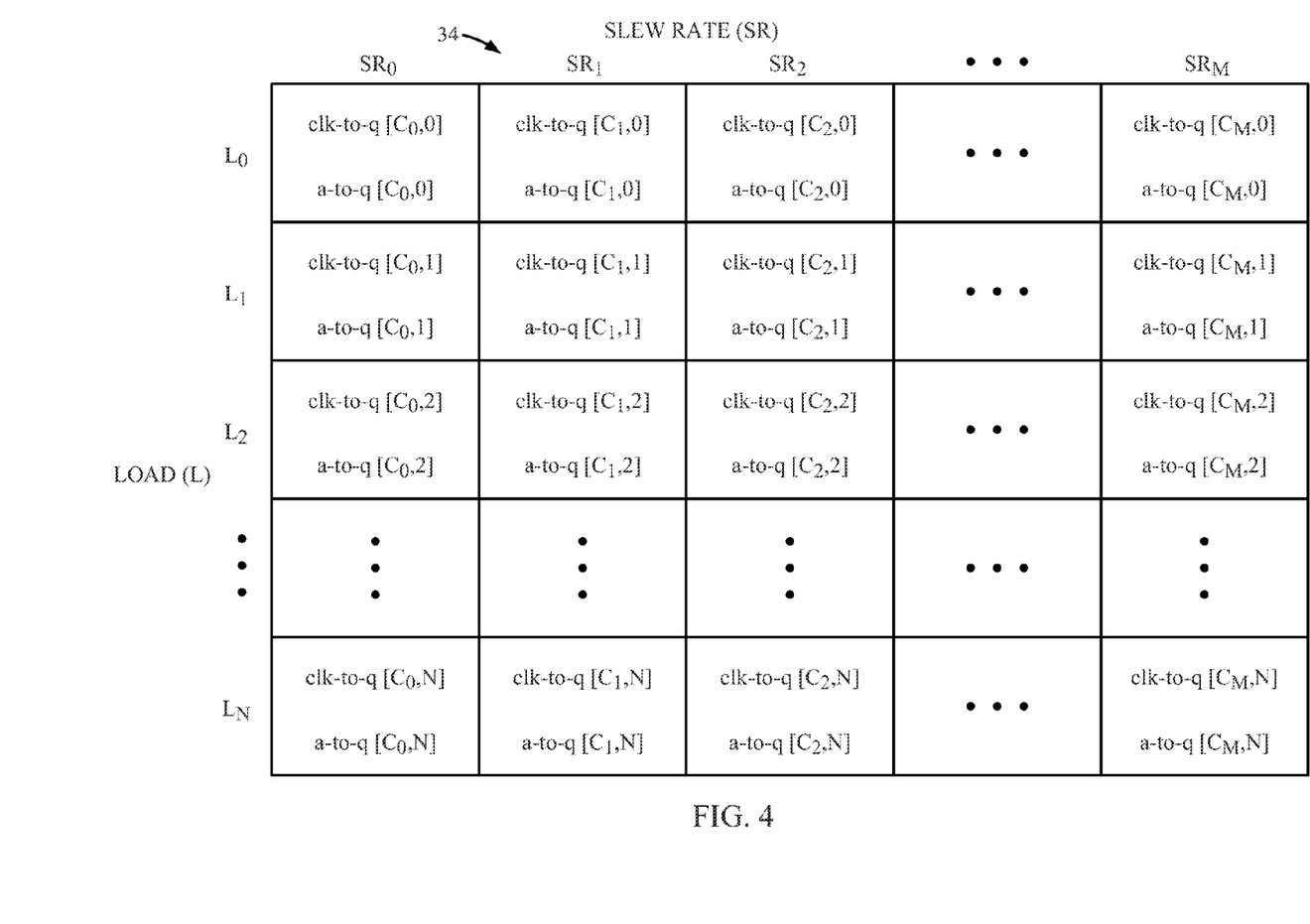
FIG. 4 is an exemplary model output delay table configured to store a plurality of model output delays for non-transparent and transparent operation of a latch based on load, slew rate, and differential timing between arrival of a clock signal and input data into a latch.

To address the situations above where using the constant "clk-to-q" delay 30 and the constant "a-to-q" delay 32 to model output delay of the latch 10 will result in an erroneous output delay, embodiments described herein model output delay for a clocked storage element in a manner that captures variations in the output delay from the constant "clk-to-q" delay 30 and the constant "a-to-q" delay 32, in this regard, in one embodiment as illustrated in an exemplary model output delay table 34 in FIG. 4, the model output delay for a clocked storage element is a function of the differential timing between arrival of the clock signal and the input data into a clocked storage element. The model output delay table 34 may be indexed by other information in addition to differential timing. In this manner, the "clk-to-q" output delay curve 26 and "a-to-q" output delay curve 28 can be used to model output delay, as opposed to using the constant "clk-to-q" delay 30 and constant "a-to-q" delay 32 in FIG. 3.

With reference to FIG. 4, the exemplary model output delay table 34 includes "clk-to-q" and "a-to-q" delays in a third dimension. For each load ($L_{0-N}$) and each slew rate ($SR_{0-M}$) combination, either the "clk-to-q" output delay curve 26 or the "a-to-q" output delay curve 28 is stored in the model output delay table 34, as opposed to only constant values representing the "clk-to-q" and "a-to-q" delays over the operating range of the latch 10. The differential timing (i.e., difference in timing) between arrival of the clock signal 12 and the input data (a) into the latch 10 is used to perform a look up into the output delay curve 26 or 28 to determine the model output delay. As will be discussed below, only one of the "clk-to-q" output delay curve 26 and the "a-to-q" output delay curve 28 need be stored, because output delay for all differential timings can be derived from either output delay curve 26, 28.

For example, with reference to FIG. 4, if the load is $L_2$ and the slew rate is $SR_1$, the output delay for use when modeling output delay of the latch 10 can either be "clk-to-q" [$C_{1, 2}$] representing a "clk-to-q" output delay curve 26, or "a-to-q" [$C_{1, 2}$] representing the "a-to-q" output delay curve 28. The differential timing between arrival of the clock signal 12 and the input data (a) into the latch 10 is used to index or perform a lookup into the one of the "clk-to-q" and "a-to-q" output delay curves 26, 28 to determine the model output delay for the latch 10. In this example, because the model output delay represents delay values in the operating range of the latch 10, it is not necessary to have two output delay models or differentiate during modeling whether the latch 10 is operating in non-transparent or transparent mode.

Figure 5:
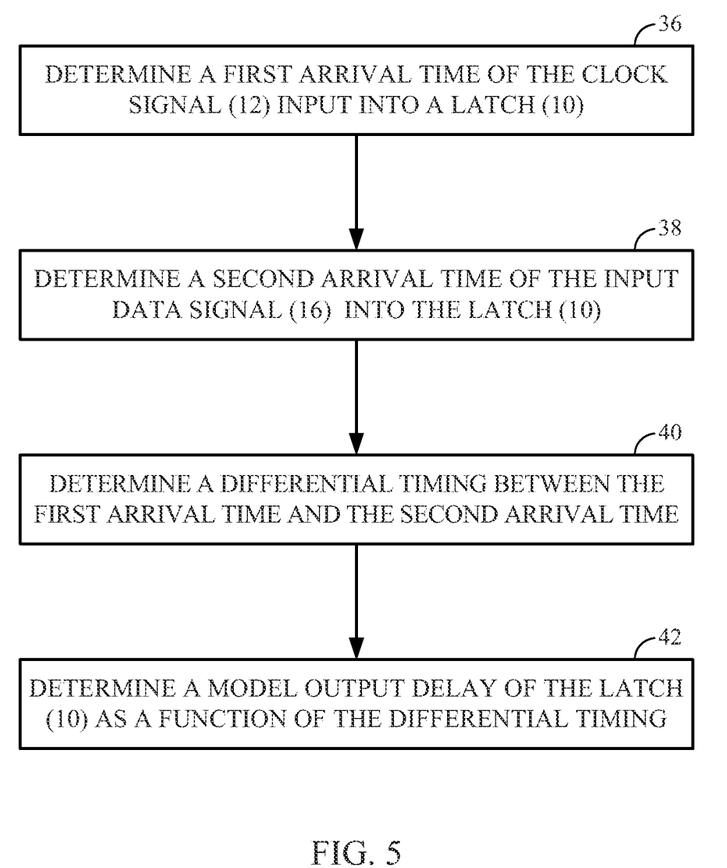
FIG. 5 is an exemplary flowchart illustrating the determination of a model output delay for a clocked storage element as a function of differential timing between arrival of a clock signal and input data.

FIG. 5 is a flowchart illustrating an example of determining a model output delay of the latch 10 in FIG. 1B using either the "clk-to-q" output delay curve 26 or the "a-to-q" output delay curve 28. In this regard, a first arrival time of the clock signal 12 input into the latch 10 is determined (block 36). A second arrival time of the input data signal 16 into the latch 10 is determined (block 38). A differential timing (i.e., the difference in timing) between the first arrival time and the second arrival time is determined (block 40). The differential timing is used to determine a model output delay for the latch 10 (block 42). For example, the differential timing can be used to perform a look up into a model output delay curve stored in the model output delay table 34 in FIG. 4 for a given load (F) and slew rate (SR).

Figure 6:
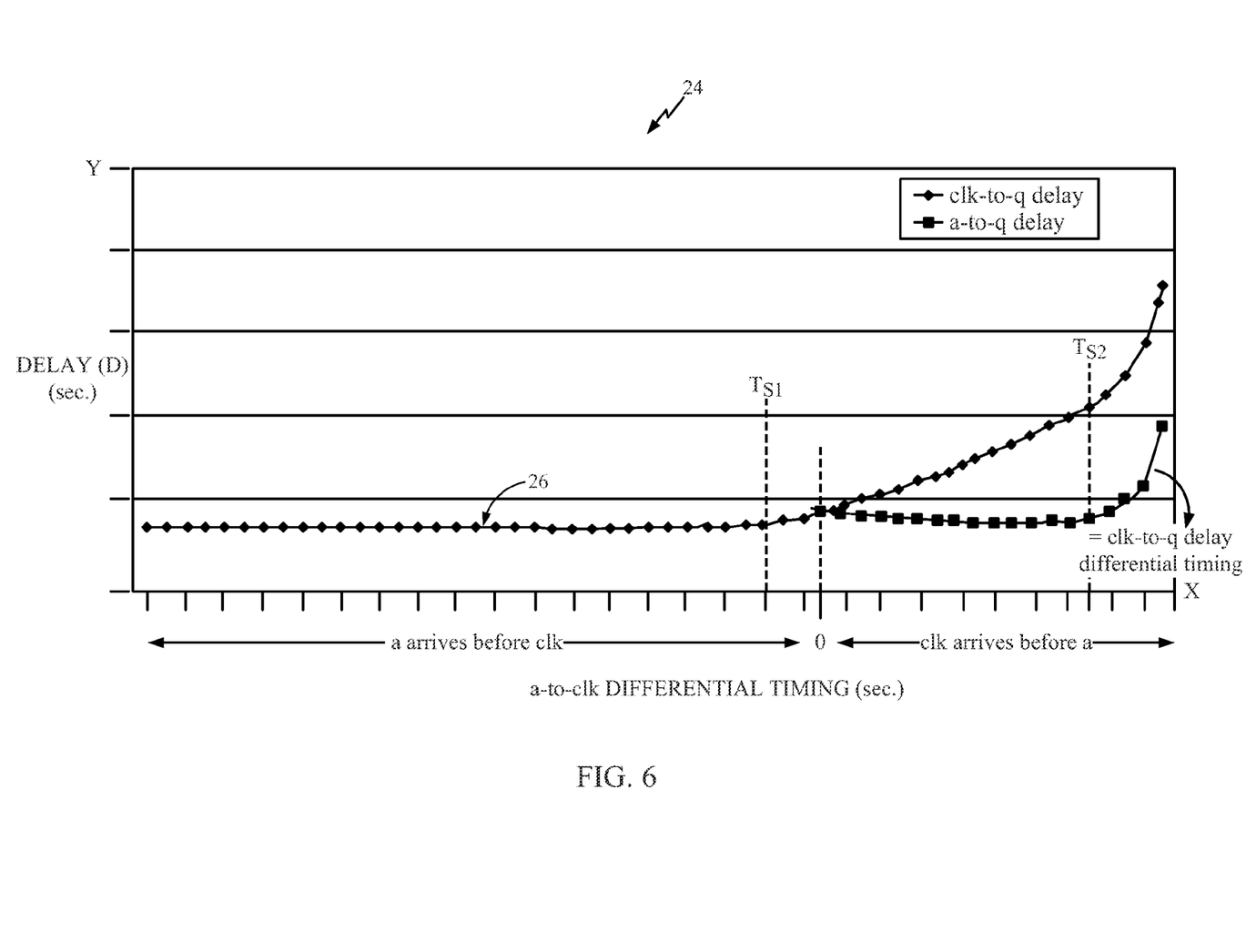
FIG. 6 is an exemplary output delay graph comprising an output delay curve for a latch based on the model output delay table in FIG. 4.

As previously discussed, it is not necessary to store both the "clk-to-q" output delay curve 26 and the "a-to-q" output delay curve 28 in the output delay model, which according to one embodiment can be provided in the model output delay table 34 in FIG. 4. This is because the value of the "clk-to-q" output delay curve 26 for any given differential timing of "a-to-clk" is the difference between the value of "a-to-q" output delay curve 28 and the differential timing. Thus, the output delay of the latch 10 can be determined using either the "clk-to-q" output delay curve 26 or "a-to-q" output delay curve 28. In this regard, FIG. 6 is the exemplary output delay graph 24 of FIG. 3, but showing only the "clk-to-q" output delay curve 26. The "a-to-q" output delay values for the latch 10 where the latch 10 is operating transparently of the clock signal 12 and the "clk-to-q" output delay curve 26 is linear as shown, but derived as the difference between the "clk-to-q" output delay curve 26 and the "a-to-clk" differential timing.

Figure 7:
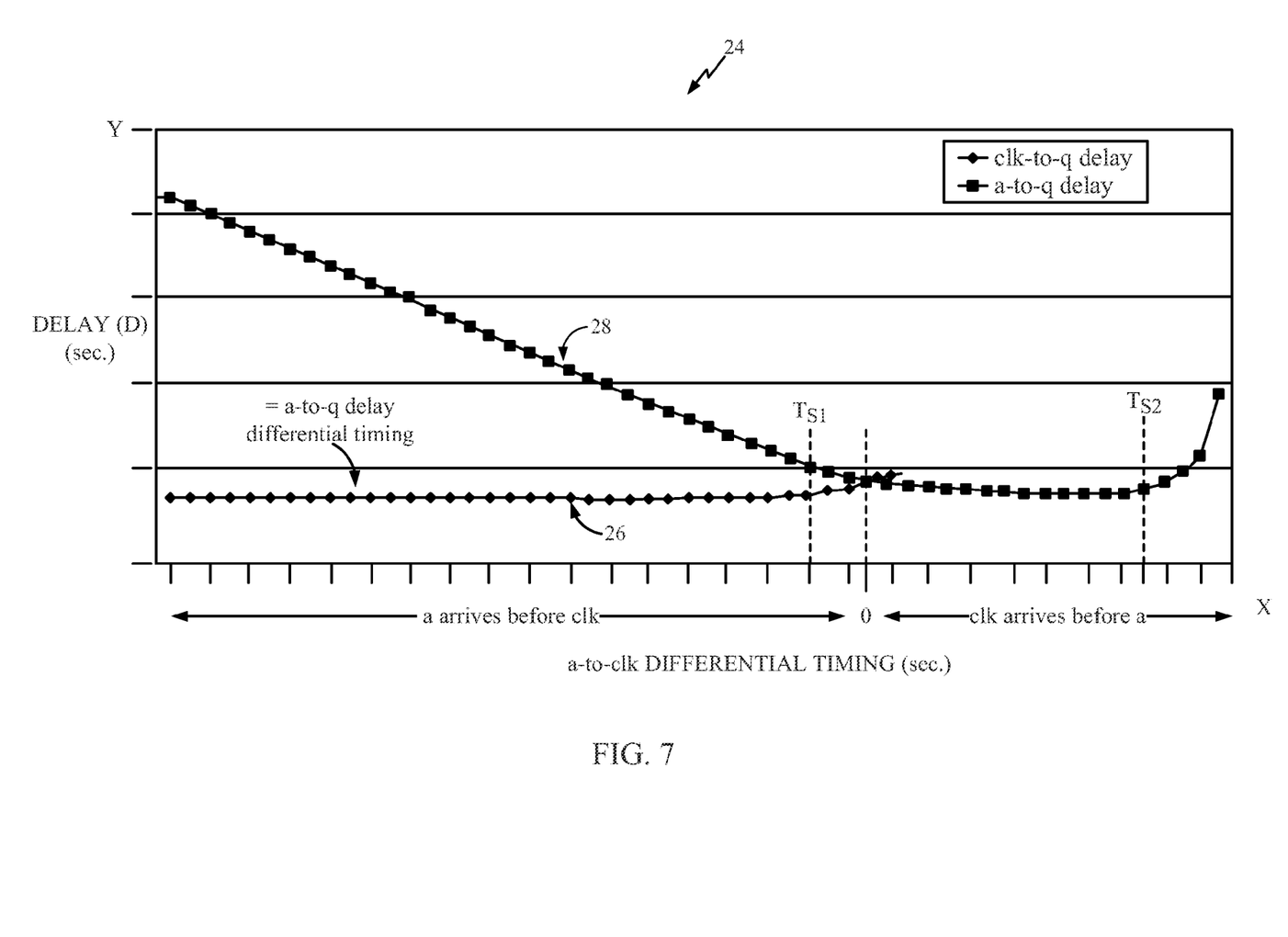
FIG. 7 is an exemplary alternative output delay graph of an output delay curve for a latch based on the model output delay table in FIG. 4.

Similarly, FIG. 7 is the exemplary output delay graph 24 of FIG. 3, but showing only the "a-to-q" output delay curve 28. The "clk-to-q" output delay values for the latch 10 where the input data (a) arrives prior to the clock signal 12 sufficient to meet the setup time ($T_{S1}$) can be derived as the difference between the "a-to-q" output delay curve 28 and the "a-to-clk" differential timing. Note that linear portions of the "clk-to-q" output delay curve 26 and the "a-to-q" output delay curve 28 could be modeled with a point and slope to derive the output delay to conserve memory. Alternatively, a combined output delay curve between the "clk-to-q" output delay curve 26 and "a-to-q" output delay curve 28 could be determined and employed to provide an output delay model.

Figure 8:
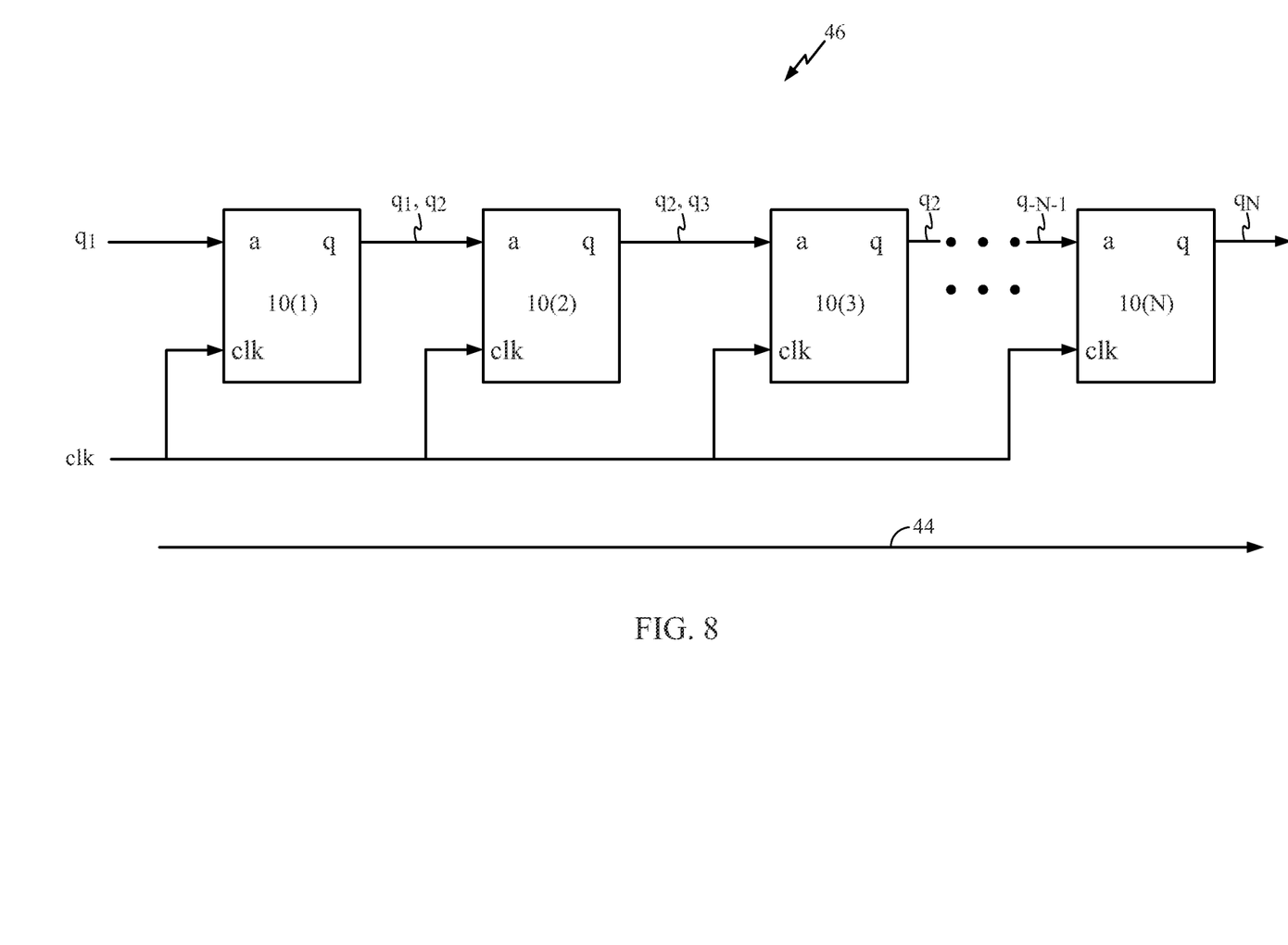
FIG. 8 is a block diagram of exemplary latches coupled together in series to form a timing path in a circuit, where the output delay of the latches can be modeled using an output delay model based on differential timing between arrival of a clock signal and input data into the latches.

To further illustrate modeling circuit timing, FIG. 8 is provided. FIG. 8 is a block diagram of an exemplary plurality of latches 10(1)-10(N) coupled together in series to form a path 44 in a circuit 46. The timing of the path 44 of the circuit 46 can be modeled using the methods, apparatuses, and systems of determining the model output delay of each of the latches 10(1)-10(N). In this regard, output delays $q_1$-$q_N$ of the latches 10(1)-10(N) can be modeled using an output delay model based on differential timing between arrival of the clock signal input (clk) and input data (a) at the latches 10(1)-10(N). The output delays $q_1$-$q_N$ of the latches 10(1)-10(N) can be used to determine the timing of the path 44 in the circuit 46. The timing of the path 44 in the circuit 46 can be used to determine if the timing constraints for the circuit 46 are met, and if not, allow modeling of delay timing after design adjustments are made to the circuit 46 prior to fabrication.

Figure 9:
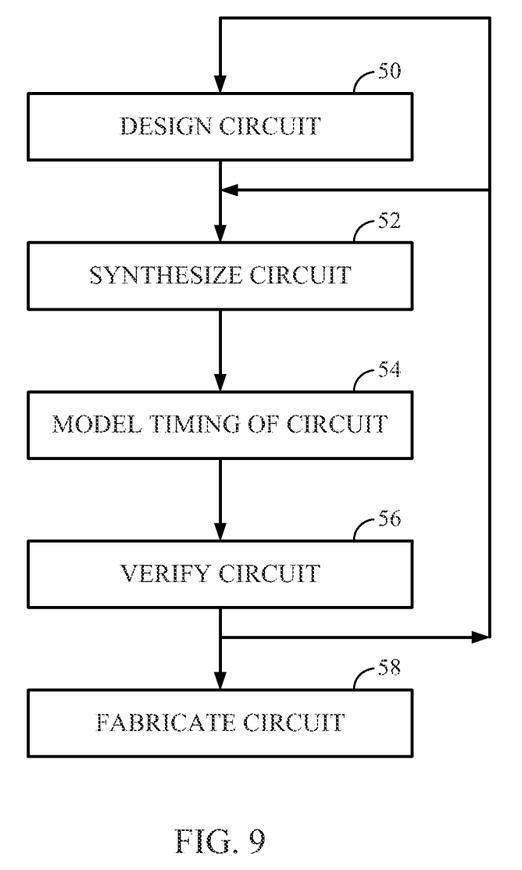
FIG. 9 is a flowchart illustrating an exemplary process for modeling output delay of a circuit between design and fabrication.

In this regard, FIG. 9 illustrates an exemplary process from design to fabrication of a circuit, wherein timing modeling according to embodiments provided herein may be employed to determine if the circuit meets timing constraints. For example, the circuit could be the circuit 46 in FIG. 8. The circuit is designed (block 50) and the circuit is thereafter synthesized (block 52) after any desired design iterations to the circuit are performed. To verify that the circuit meets desired timing constraints, prior to fabrication, the timing of the circuit and the clocked storage elements contained in paths within the circuit, including but not limited to critical paths, can be modeled according to embodiments provided herein (block 54). After the timing of the circuit is modeled, it can be verified whether timing constraints for the circuit are met (block 56). The more accurate the modeling of the timing of the circuit, the more likely the actual timing of the circuit after fabrication will meet the modeled timing of the circuit. If time constraints are met by the modeled timing of the circuit, the circuit may be fabricated (block 58). If timing constraints are not met by the modeled timing of the circuit, the design of the circuit may be revisited or altered (block 50) and/or the circuit may be re-synthesized (block 52).

The circuit modeling methods, apparatuses, systems, and computer-readable mediums for modeling output delay of a clocked storage element(s) discussed herein may be used to model output delay for clocked storage elements in any circuit or system, including but not limited to a synchronous digital circuit, CPU system, and a memory circuit or system. A timing model configured to employ the methods, apparatuses, systems, and computer-readable mediums for modeling output delay of a clocked storage element(s) discussed herein may also be provided in any circuit or system, including but not limited to a synchronous digital circuit, central processing unit (CPU) system, and a memory circuit or system. In these regards, the memory circuit or system may be any type of memory. Examples include, without limitation, static random access memory (RAM) (SRAM), dynamic RAM (DRAM), synchronous DRAM (SDRAM), data-double-rate (DDR) SDRAM, data-double-rate-two (DDR2) SDRAM, data-double-rate-three (DDR3) SDRAM, Mobile DDR (MDDR) SDRAM, low-power (LP) DDR SDRAM, and LP DDR2 SDRAM. These forms of memory may also be computer-readable mediums that contain software instructions capable of determining the model output delay for clocked storage elements as discussed herein.

The circuit modeling methods, apparatuses, systems, and computer-readable mediums for modeling output delay of a clocked storage element(s) discussed herein may be used to model output delay for a clocked storage element included or integrated in a semiconductor die, integrated circuit, and/or device, including an electronic device and/or processor-based device or system. A circuit timing model configured to employ the methods, apparatuses, systems, and computer-readable mediums for modeling output delay of a clocked storage element(s) discussed herein may also be included or integrated in a semiconductor die, integrated circuit, and/or device, including an electronic device and/or processor-based device or system. In these regards, examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a Digital Signal Processor (DSP), an Application Specific Integrated Circuit (ASIC), a Field Programmable Gate Array (FPGA), a processor-based device, a controller-based device, a monitor, a computer monitor, a television, a tuner, a radio, a satellite radio, a music player, a digital music player, a portable music player, a video player, a digital video player, a digital video disc (DVD) player, and a portable digital video player.

Figure 10:
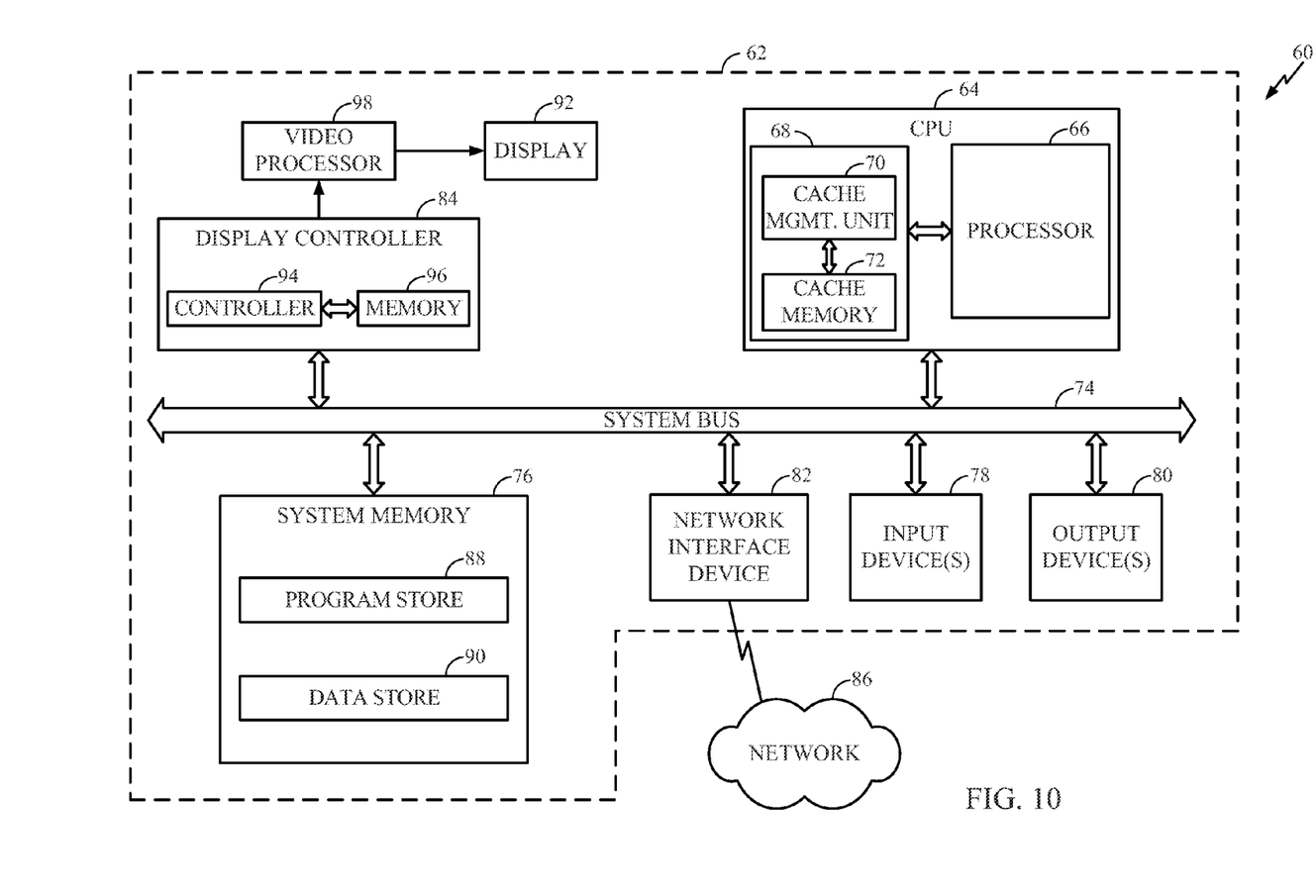
FIG. 10 is block diagram of an exemplary central processing unit (CPU) circuit and related system employing clocked storage elements whose output delay can be modeled according to the embodiments described herein, and/or which can execute instructions and/or otherwise providing a circuit timing model configured to model output delay of clocked storage elements according to the embodiments described herein.

In this regard, FIG. 10 illustrates a processor-based system 60. The processor-based system 60 includes clocked storage elements that may be modeled using the timing model and model output delay determination embodiments provided herein. Also, the processor-based system 60 may execute software instructions that perform the timing modeling and model output delay determinations for other circuits. The software instructions may be provided in a computer-readable medium. The processor-based system 60 may be included in an electronic device 62, including any of those previously referenced above. In this example, the processor-based system 60 includes a central processing unit (CPU) 64 that includes a processor 66 and an integrated cache system 68. The cache system 68 includes a cache management unit 70 that controls access to a cache memory 72 accessible to the processor 66 for rapid access to temporary storage for frequently accessed data. The CPU 64 is coupled to a system bus 74, which interconnects the other devices included in the processor-based system 60. As is well known, the CPU 64 communicates with these other devices by exchanging address, control, and data information over the system bus 74. These devices may include any types of devices. As illustrated in FIG. 10, these devices may include system memory 76, one or more input devices 78, one or more output devices 80, a network interface device 82, and a display controller 84, as examples. The system memory 76 is one example of a computer readable medium.

The one or more input devices 78 may include any type of input device, including but not limited to input keys, switches, voice processors, memory drives, disks, compact disc (CD), digital video disc (DVD), etc. These input devices 78 may also be computer-readable mediums that contain software instructions. The one or more output devices 80 may include any type of output device, including but not limited to audio, video, other visual indicators, etc. The network interface device 82 may be any device configured to allow exchange of data to and from a network 86. The network 86 may be any type of network, including but not limited to a wired or wireless network, private or public network, a local area network (LAN), a wide local area network (WLAN), and the Internet. The network interface device 82 may support any type of communication protocol desired.

The CPU 64 may also access system memory 76 over the system bus 74. The system memory 76 may include circuits and methods previously described above to access the system memory 76. The system memory 76 may include static memory and/or dynamic memory. The system memory 76 may include a program store 88 and a data store 90 for the CPU 64. The CPU 64 may also access the display controller 84 over the system bus 74 to control information sent to a display 92. The display controller 84 may include a memory controller 94 and memory 96 to store data to be sent to the display 92 in response to communications with the CPU 64. The display controller 84 sends information to the display 92 to be displayed via a video processor 98, which processes the information to be displayed into a format suitable for the display 92. The display 92 may include any type of display, including hut not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an ASIC, an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of modeling output delay of at least one clocked storage element, comprising:
   determining a first arrival time of a clock signal input into at least one clocked storage element;
   determining a second arrival time of an input data signal input into the at least one clocked storage element;
   determining a differential timing between the first arrival time and the second arrival time; and
   determining a unified model output delay of the at least one clocked storage element, the unified model output delay covering both (1) when arrival of the clock signal input precedes arrival of the input data signal and (2) when arrival of the clock signal input follows arrival of the input data signal as a function of one of:
   a first piecewise function of a "clk to q" delay and a difference between the "clk to q" delay and the differential timing; and
   a second piecewise function of an "a to q" delay and a difference between the "a to q" delay and the differential timing.

2. The method of claim 1, further comprising associating the unified model output delay with the at least one clocked storage element in a circuit timing model.

3. The method of claim 1, further comprising modeling transparency of the at least one clocked storage element based on the unified model output delay in a circuit timing model.

4. The method of claim 1, further comprising determining the unified model output delay of the at least one clocked storage element additionally based on at least one of a slew rate of the clock signal and a load coupled to the at least one clocked storage element.

5. The method of claim 1, further comprising determining the unified model output delay of the at least one clocked storage element based on an output delay table comprising a plurality of model output delays indexed by at least the differential timing.

6. A circuit timing modeling apparatus, comprising:
a control system configured to:
    determine a first arrival time of a clock signal input into at least one clocked storage element;
    determine a second arrival time of an input data signal input into the at least one clocked storage element;
    determine a differential timing between the first arrival time and the second arrival time; and
    determine a unified model output delay of the at least one clocked storage element, the unified model output delay covering both (1) when arrival of the clock signal input precedes arrival of the input data signal and (2) when arrival of the clock signal input follows arrival of the input data signal as a function of one of:
        a first piecewise function of a "clk to q" delay and a difference between the "clk to q" delay and the differential timing; and
        a second piecewise function of an "a to q" delay and a difference between the "a to q" delay and the differential timing.

7. The apparatus of claim 6, wherein the control system is further configured to associate the unified model output delay with the at least one clocked storage element in a circuit timing model.

8. The apparatus of claim 6, wherein the control system is further configured to model transparency of the at least one clocked storage element based on the unified model output delay in a circuit timing model.

9. The apparatus of claim 6, wherein the control system is further configured to determine the unified model output delay of the at least one clocked storage element additionally based on at least one of a slew rate of the clock signal and a load coupled to the at least one clocked storage element.

10. The apparatus of claim 6, wherein the control system is further configured to determine the unified model output delay of the at least one clocked storage element based on a model output delay table comprised of a plurality of model output delays indexed by at least the differential timing.

11. The apparatus of claim 6 integrated in at least one semiconductor die.

12. The apparatus of claim 6, further comprising a device selected from the group consisting of a computer, a portable computer, a desktop computer, Digital Signal Processor (DSP), an Application Specific Integrated Circuit (ASIC), a Field Programmable Gate Array (FPGA), a processor-based device, and a controller based device, into which the circuit timing modeling apparatus is integrated.

13. A non-transitory computer-readable medium for modeling output delay of at least one clocked storage element, the computer-readable medium comprising instructions for:
    determining a first arrival time of a clock signal input into at least one clocked storage element;
    determining a second arrival time of an input data signal input into the at least one clocked storage element;
    determining a differential timing between the first arrival time and the second arrival time; and
    determining a unified model output delay of the at least one clocked storage element, the unified model output delay covering both (1) when arrival of the clock signal input precedes arrival of the input data signal and (2) when arrival of the clock signal input follows arrival of the input data signal as a function of one of:
        a first piecewise function of a "clk to q" delay and a difference between the "clk to q" delay and the differential timing; and
        a second piecewise function of an "a to q" delay and a difference between the "a to q" delay and the differential timing.

14. The computer-readable medium of claim 13, further comprising instructions for associating the unified model output delay with the at least one clocked storage element in a circuit timing model.

15. The computer-readable medium of claim 13, further comprising instructions for modeling transparency of the at least one clocked storage element based on at least the unified model output delay in a circuit timing model.

16. The computer-readable medium of claim 13, further comprising instructions for determining the unified model output delay of the at least one clocked storage element additionally based on at least one of a slew rate of the clock signal and a load coupled to the at least one clocked storage element.

17. The computer-readable medium of claim 13, further comprising instructions for determining the unified model output delay of the at least one clocked storage element based on a model output delay table comprised of a plurality of model output delays indexed by at least the differential timing.

* * * * *